March 4, 1952 — J. M. PESTARINI — 2,587,648
ELECTRIC POWER SYSTEM
Filed Dec. 20, 1946 — 2 SHEETS—SHEET 1

INVENTOR
Joseph M. Pestarini
BY
Philip G. Hilbert
ATTORNEY

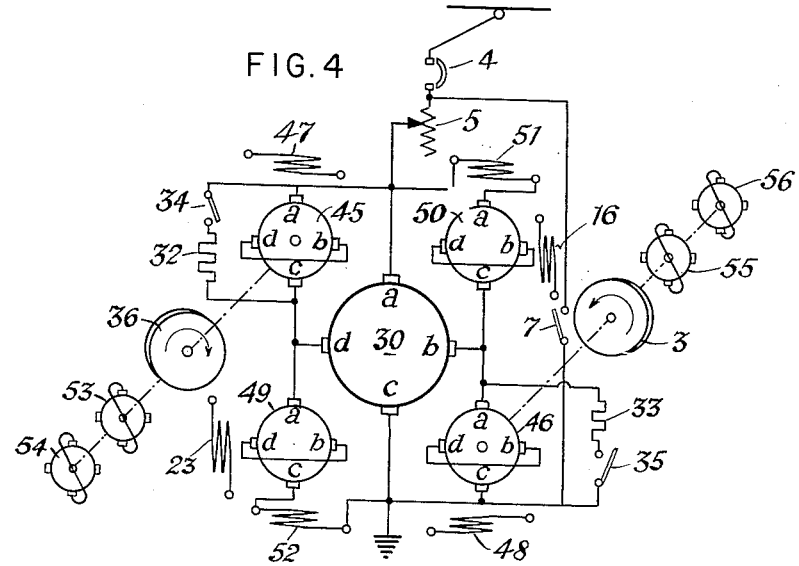

Patented Mar. 4, 1952

2,587,648

UNITED STATES PATENT OFFICE 2,587,648

ELECTRIC POWER SYSTEM

Joseph Maximus Pestarini, Staten Island, N. Y.

Application December 20, 1946, Serial No. 717,505
In Great Britain September 25, 1946

6 Claims. (Cl. 171—123)

This invention relates to traction equipment for direct current overhead line and particularly to those cases where electric energy is transformed into kinetic energy and stored in order to transform it back again into electric energy and supply it to the equipment when it is deemed useful.

The invention discloses motor means for transforming electric energy into kinetic energy and the reverse, means for controlling the power flow in one or the other direction and to cause it to follow an arbitrarily predetermined law.

In the event that the maximum speed of the rotating masses of said motor means rotating at variable speed is reached while the braking stage is incomplete, and it is thus necessary to absorb electric energy and to dissipate it into heat; means is provided for automatically effecting such transformation.

The invention discloses arrangements by which a dynamoelectric machine is used for controlling the power transfer between propulsion motors, a current source and variable speed electrical machines.

An object of this invention is to provide an electric power system including a source of current in circuit with motors having accelerating and decelerating periods, together with dynamoelectric machines of the metadyne type and variable speed machines arranged in a manner to allow suitable interchange of power between the motors on the one hand and the source of current, the dynamoelectric machine and the variable speed machines, on the other hand, during the accelerating and decelerating periods of the motors.

The invention is described with the aid of the following examples of application, reference being made to the accompanying drawings.

Figure 1 shows a system embodying the invention; Figures 2, 3, 4 and 5 show modifications thereof.

In Fig. 1 is shown a dynamoelectric machine 30 of the transformer metadyne type, more particularly described in application Ser. No. 712,989, filed November 29, 1946 and in application Ser. No. 715,792, filed December 12, 1946. Such a machine comprises an armature provided with a set of primary brushes $a$, $c$ and a set of secondary brushes $b$, $d$, together with stator windings 31, 39. A flywheel 36 is coupled to the shaft of machine 30. The primary brushes are connected to an overhead line providing a constant voltage, through switch 4 and a rheostat 5. Propulsion motors PM1, PM2 are connected between brushes $a$, $b$; $c$, $d$, respectively. Rotatable electric machines adapted to rotate at periodically varying speed, SML1, SML2, are connected in parallel with motors PM1, PM2, respectively. The machines SML1, SML2 are adapted to store kinetic energy in their rotating masses and to transform such energy into electric energy for said propulsion motors. Resistors 32, 33 may be connected across brushes $a$, $d$; $b$, $c$; respectively, when switches 34, 35, respectively are closed. Switches 57, 58 are provided for short circuiting brushes $a$, $d$; $b$, $c$, respectively.

A dynamoelectric machine 2 having an armature provided with a set of primary brushes $a$, $c$ and a set of short circuited secondary brushes $b$, $d$, is connected by means of its primary brushes to the primary brushes of machine 30. The machine 2 has operating characteristics similar to that of machines SML1, SML2. The machine 2 is provided with a flywheel 3 coupled to its shaft and a stator winding 11 independently excited as hereinafter described. Such a machine is more fully described in application Ser. No. 698,372, filed September 20, 1946. A switch 7 connects brush $c$ of machine 30 to a point between rheostat 5 and switch 4. Switch 4 is adapted to remain open when switch 7 is closed and vice versa.

The machine 30 is coupled with the flywheel 36 and with a speed regulator dynamo 37 shunt excited by a field winding 38 and supplies the regulator winding 39 of the machine with current. The resistance of the circuit of the field excitation is made variable by the operation of a rheostat 43, controlled by a governor dynamo 40. The dynamo 40 is energized by a direct current source not shown, and is connected in series with a resistor 44 for limiting the current traversing the armature of the governor dynamo when at standstill. The governor dynamo is shown provided with field excitation windings 41 and 42 traversed respectively by currents $x$ and $y$ for controlling the torque and therefore the orientation and the movement of the governor dynamo. Finally the regulator dynamo 37 is shown connected to a constant voltage direct current source not shown.

The system shown in Fig. 1 is made operative by starting machines 2, 30. To this end, switch 7 is opened, switch 4 is closed and rheostat 5 is regulated to allow the machines to start and reach their normal operating speed. Assume that switches 57, 34, 35, 58, are open. Winding 31 is adapted to be energized by a source of current as shown in Fig. 3, thereby controlling the current supplied by machine 30 to the motors PM1, PM2, until a maximum motor speed is reached. When it is desired to cause the motors to brake and recuperate energy, the switch 4 is opened, thus disconnecting the overhead line from the system. Switches 57, 58 are then closed and winding 31 is adapted to be energized in a manner to control the operation of machine 30 and cause the motors to brake. The recuperated energy from the motors is then partly absorbed by the machine 2, by controlling the energization of winding 11, as shown in Fig. 3. Similarly, the devices SML1, SML2 operate as machine 2, to absorb another portion of the recuperated energy. In the same manner windings 41, 42 of governor dynamo 40 are energized to cause machine 30 to increase its speed and to absorb the residual power derived from the braking action of the motors.

During the braking period, the flywheels 3, 36 and the rotation masses of the devices SML1, SML2 increase their speed and reach their maximum, safe speed limit. If the safe speed limit is reached before the end of the braking period, the recuperated energy may be absorbed by the resistors 32, 33 and rheostat 5, by closing the switches 34, 35, 7 and opening switches 57, 58, while suitably regulating rheostat 5.

During the braking period, it is possible to supply power to the line, if desired, in which case, the switches 57, 34, 25, 58 and 7 are opened, switch 4 is closed and rheostat 5 is suitably adjusted.

The energy stored in flywheels 3, 36 and the rotating masses of devices SML1, SML2, may be transferred into electrical energy and supplied to motors PM, PM2 during the subsequent starting and motoring periods of the motors.

The machines 30 hereinafter described may be provided with a governor dynamo 40 for controlling their speed similarly.

It is also understood that the governor dynamo 40 and flywheel 36 may be omitted and in that case, the machine 30 will rotate at a substantially constant speed. In this case, the energy recuperated by the motors PM1, PM2, will be absorbed and stored in the form of kinetic energy by the devices SML1, SML2 and machine 2, in the absence of machine 30 as an energy storage medium.

Figures 1, 2, 3:
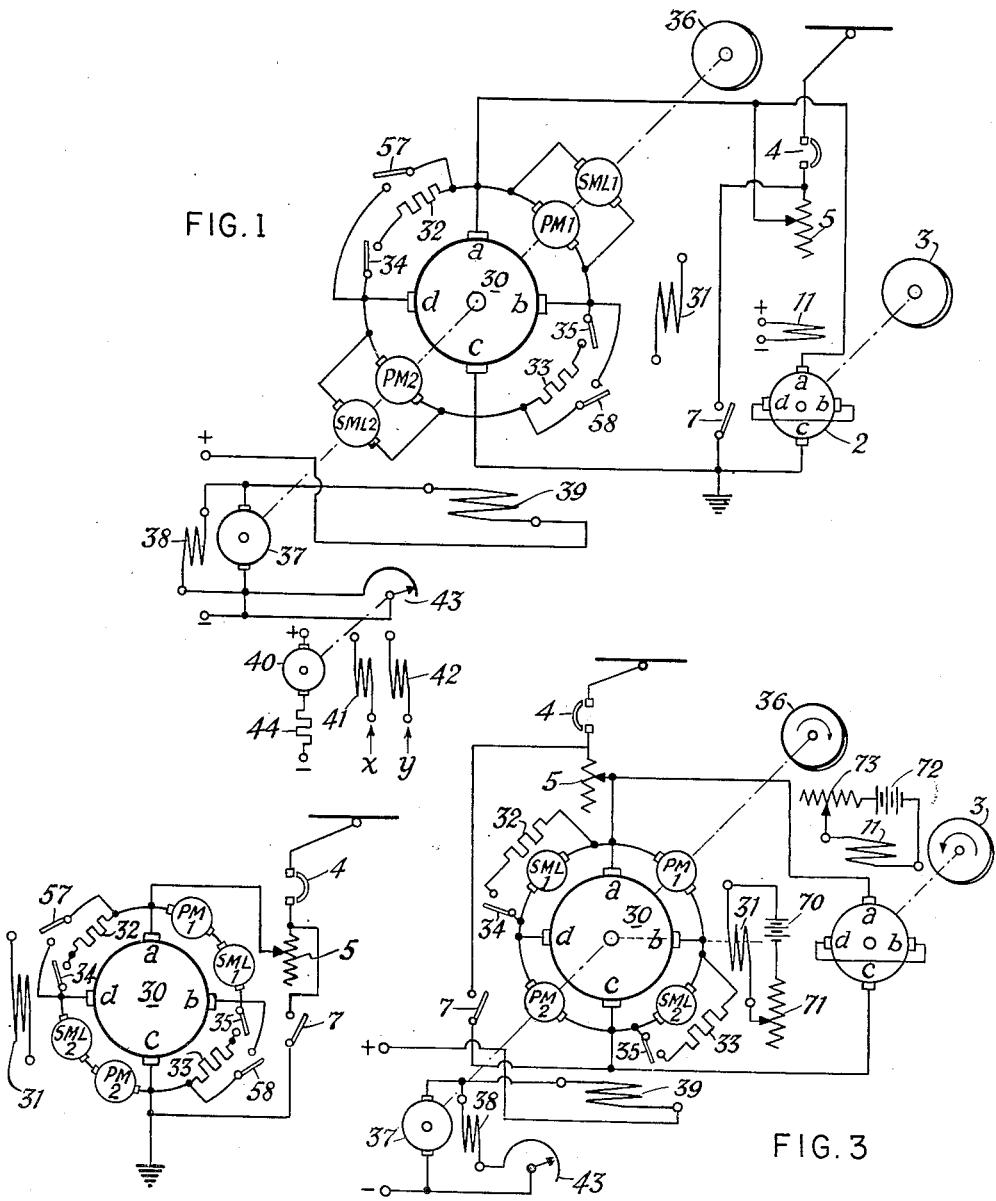
Figure 2 shows a machine 30 with its brushes $a$ and $b$ energizing a propulsion motor PM1, series connected to a device SML1 of the type previously described. The brushes $d$ and $c$ energize another propulsion motor PM2 series connected to device SML2.
Fig. 3 is similar to Fig. 1 except that the devices SML1, SML2, are connected between brushes $a, d$; $b, c$, respectively and the switches 57, 58 become unnecessary.

On Figure 3, the machine 30 is shown provided with a regulator dynamo 37 and a governor dynamo 40 as previously described. The connections between machines 30 and 2 are as shown in Fig. 1. The machine 30 is shown provided with a stator winding 31 energized by the battery 70 through the rheostat 71; by controlling the current traversing the winding 31, the operation of the metadyne 30 is controlled.

The machine 2 is shown provided with a stator winding 11 energized by the battery 72 through the rheostat 73; by controlling the current traversing the winding 11, the current traversing the machine 2 is determined.

The flywheel 3 of the machine and the flywheel 36 of the machine 30 are indicated as rotating in opposite directions. According to the invention, the rotating masses of devices PM1, PM2; SML1, SML2, are preferably divided into pairs, the machines of each pair rotating in the opposite direction and wherever possible along the same linear axis and with speed kept proportional to one another so that a balance may be obtained of the gyroscopic effect taking into account the relative speed and moment of inertia.

In Fig. 4 is shown a dynamoelectric machine 30, of the type previously described, with motors 50, 49, connected thereto. Each of the similar motors 50, 49, comprises an armature provided with a pair of short circuited secondary brushes $b, d$ and a pair of primary brushes $a, c$. The motor 50 has its primary brushes connected to the brushes $a, b$ of machine 30 while motor 49 has its primary brushes connected to the brushes $c, d$ of machine 30. Motors 50, 49 are provided with stator windings 51, 52, respectively which are connected in series with brushes $a, c$, of the respective motors. Windings 51, 52 have their magnetic axes along the commutating axis of the primary brushes of the motors and are adapted to create ampere turns in a direction opposite to that of the armature primary circuit and substantially compensating the ampere turns of the armature primary circuit. The motors 50, 49 are further provided with independently excited stator windings 16, 23, respectively, which are adapted to control the torque of the motors and the direction of their rotation. Such motors are more fully described in application Ser. No. 707,699, filed November 4, 1946.

Motors 45, 46, which may be of the metadyne type, more completely described in application Ser. No. 698,372, filed September 20, 1946, comprises an armature provided with a pair of short circuited secondary brushes $b, d$, a pair of primary brushes $a, c$ and independently excited stator windings 47, 48, respectively. The motor 45 has its primary brushes connected to brushes $a, d$ of machine 30 while motor 46 has its primary brushes connected to brushes $b, c$ of machine 30. A resistor 32 and switch 34 is provided in short circuiting relation to the primary brushes of motor 45 and similarly, a resistor 33 and switch 35 is provided in short circuiting relation to the primary brushes of motor 46.

The motors 45, 46 are coupled to flywheels 36 and 3 respectively, said flywheels rotating in opposite directions.

The machines 30, the propulsion motors, and the motors of variable speed, heretofore referred to, may be provided with stator windings energized by means of dynamoelectric machines such as amplifier metadynes more fully described in Patent 2,112,604, which may be driven by variable speed devices.

In Figure 4, four dynamoelectric machines 53, 54, 55, 56, of the amplifier metadyne type are schematically shown. The machines 55 and 56 are being driven by the motor 46 and the machines 53 and 54 are being driven by the motor 45. For example, metadynes 53, 54 may energize the stator windings 47 and 23, respectively. Similarly machines 55, 56, may energize stator windings 16, 48 respectively.

Figure 4 shows flywheels 3, 36 rotating in opposite directions and maintaining the same speed at any given moment in view of the symmetrical operation of the motors 45, 46 driving them.

In Figure 5, a machine 30 is connected in series with a pair of motors 12 and 21, which are similar to motors 50, 49, previously described. the thus formed system being subjected to the voltage of the overhead line. Stator windings 15, 22 are respectively, series connected to the primary brush $a$ of the motors 12, 21, respectively. The motors 12, 21 have their windings 23, 16 energized by exciter machines 13, 61, respectively. The control of the motors 12, 21 is obtained through the ampere turns of the stator windings of the corresponding exciter machines, or by an adequate voltage imposed on the primary brushes $a$ and $c$ of the exciter machines. The terminals 59 and 60 of the exciter machine 13 and the terminals 62 and 63 of the exciter machine 61, are conveniently connected to a source of energy, not shown, as explained in the application Serial Number 715,792 by the same applicant as referred to above.

The machine 30 is further shown in this figure as energizing motors 49 and 50 operating as propulsion motors and motors 45 and 46 operating as variable speed motors, in the manner shown in Fig. 4.

In Figure 5, the devices 21, 12, 46, 45 are provided with flywheels 3, 36, 64 and 67. The flywheels 3 and 36 rotate in opposite directions and at the same absolute value of the speed at any moment because of the symmetry of the operation of the respective motors. Similarly, flywheels 64, 67 rotate in opposite directions.

If it is desired to lock any vehicle against movement, according to the invention, one may use motors such as motors 45, 46, 49, 50 as propulsion motors and feed their armature with current. In case of any movement, no matter what its direction, the short circuited secondary brushes of the motors will create a flux developing a torque opposing the movement.

In the above described forms of the instant invention, it has been found that power may be interchanged between the propulsion motors which have accelerating and decelerating periods, the variable speed machines, the source of direct current and the dynamoelectric machine 30 when the brushes $a$, $b$, $c$, and $d$ of the machine 30 are displaced relative to each other so that the flux due to the currents of the propulsion motors which traverse the armature of machine 30 and the resultant flux due to the currents of the variable speed machines and current source which traverse the armature of the machine 30, form an electrical angle greater than zero and preferably 90°.

I claim:

1. An electric power system comprising motors having accelerating and decelerating periods, a dynamoelectric machine including an armature associated with a commutator having a plurality of brushes and a stator winding, a direct current source and rotatable variable speed electric machines, means for connecting said motors to selected pairs of said brushes, means for connecting said current source to a selected pair of brushes and means for connecting said variable speed machines to selected pairs of brushes, said pairs of brushes being displaced relative to each other whereby the flux created by currents of said motors traversing the armature of said dynamoelectric machine and the resultant flux created by the currents of said variable speed machines and said current source traversing the armature of said dynamoelectric machine form an electrical angle of substantially 90°.

2. An electric power system as in claim 1, wherein each of said motors is connected in parallel with a variable speed machine.

3. An electric power system as in claim 1, wherein each of said motors is connected in series with a variable speed machine.

4. An electric power system as in claim 1, and further including resistors in circuit with selected pairs of brushes and switch means selectively operable to allow power to pass to said variable speed machines, to said resistors and to said current source during deceleration periods of said motors.

5. An electric power system as in claim 1, wherein said dynamoelectric machine includes a plurality of stator windings and means for automatically varying the operative speed of said dynamoelectric machine comprising a regulator dynamo in circuit with one of said stator windings and a governor dynamo operative to vary the resistance of the excitation of said regulator dynamo.

6. An electric power system comprising motors having accelerating and decelerating periods, a dynamoelectric machine including an armature associated with a commutator having a plurality of brushes, and a plurality of stator windings, a direct current source and variable speed electric machines, said motors being connected to selected pairs of brushes, said current source being connected to a selected pair of brushes and said variable speed machines being connected to selected pairs of brushes, said brushes being arranged relative to each other to allow the interchange of power between said motors, said variable speed machines and said current source during the accelerating and decelerating periods of said motors, said variable speed machines increasing in speed during said decelerating periods.

JOSEPH MAXIMUS PESTARINI.

No references cited.